United States Patent [19]
Anthony

[11] Patent Number: 5,176,205
[45] Date of Patent: Jan. 5, 1993

[54] CORROSION RESISTANT CLAD ALUMINUM ALLOY BRAZING STOCK

[75] Inventor: William H. Anthony, Clarence Center, N.Y.

[73] Assignee: General Motors Corp., Detroit, Mich.

[21] Appl. No.: 722,454

[22] Filed: Jun. 27, 1991

[51] Int. Cl.$^5$ .............................................. F28F 19/00
[52] U.S. Cl. ................................. 165/133; 165/134.1; 165/153; 228/183
[58] Field of Search ................. 165/133, 134.1, 153, 165/152; 228/183

[56] References Cited

U.S. PATENT DOCUMENTS

| | | | |
|---|---|---|---|
| 3,872,921 | 3/1975 | Anthony et al. | 165/152 |
| 3,960,208 | 6/1976 | Anthony et al. | 165/1 |
| 4,203,490 | 5/1980 | Terai et al. | 165/134.1 |
| 4,209,059 | 6/1980 | Anthony et al. | 165/1 |
| 4,214,925 | 7/1980 | Arita et al. | 148/127 |
| 4,317,484 | 3/1982 | Tanabe et al. | 165/134.1 |
| 4,410,036 | 10/1983 | Kanada et al. | 165/134.1 |
| 4,470,455 | 9/1984 | Sacca | 165/167 |
| 4,776,392 | 10/1988 | Loyd | 165/134.1 |
| 4,915,163 | 4/1990 | Matsunaga et al. | 165/153 |

OTHER PUBLICATIONS

*Alloy 3005 Elemental Composition* taken from "Registration Record of Aluminum Association Designations and Chemical Composition Limits for Wrought Aluminum and Wrought Aluminum Alloys", The Aluminum Association, Inc. Washington DC (1987).

*Primary Examiner*—Allen J. Flanigan
*Attorney, Agent, or Firm*—George A. Grove; Domenica N. S. Hartman

[57] ABSTRACT

An improved aluminum alloy brazing stock material is provided for use in a tubeplate-and-center type evaporator within an automobile air conditioning system. The improved aluminum alloy brazing stock contains a unique aluminum alloy core material that has been clad on both sides with an appropriate aluminum-silicon brazing alloy. The inventive aluminum alloy core material is characterized by a higher copper concentration and a lower manganese concentration as compared to conventional aluminum alloys used in these types of automotive evaporator units. An air conditioning evaporator unit from the aluminum alloy brazing stock material of this invention is characterized by enhanced corrosion resistance. In addition, the brazing stock material of this invention is sufficiently ductile to be stamped at room temperature and exhibits good strength even over the extensive thermal cycling characteristic of an automotive environment.

10 Claims, 1 Drawing Sheet

CORROSION RESISTANT CLAD ALUMINUM ALLOY BRAZING STOCK

The present invention relates to an improvement in the clad aluminum brazing stock material used to form the tubeplate type evaporator units within an automotive air conditioning system. More particularly, this invention relates to such an aluminum brazing stock material, which is characterized by a core layer of an improved aluminum alloy that is clad on both sides with an appropriate aluminum-silicon brazing alloy, wherein the improved brazing stock material is characterized by enhanced corrosion resistance as compared to conventional materials without a loss in its ductility, strength or brazeability.

BACKGROUND OF THE INVENTION

Air conditioning systems are routinely employed within automobiles and other vehicles for creating comfortable conditions within the passenger compartment for the vehicle occupants. At outside temperatures above about 70° F., it is difficult to maintain a comfortable passenger compartment temperature without first cooling the air that is being blown into the passenger compartment.

Typically, cooling of the air is accomplished by first compressing an appropriate refrigerant, such as the fluorocarbon known as Freon or other alternative refrigerants. Within an automobile, the engine-driven compressor compresses the vaporized refrigerant, thereby significantly raising the temperature of the refrigerant. The refrigerant then flows into a condenser where it is cooled and returned to its liquid state; thus, the heat added to the refrigerant in the compressor is transferred out of the system. The cooled liquid refrigerant is then sprayed through an expansion valve into an evaporator where it is again vaporized. The heat of vaporization required for vaporizing the refrigerant is drawn from the incoming outside air, which is blown around the evaporator. Any excess humidity contained within the incoming air is removed as condensation on the evaporator, therefore also drying the incoming air. The cooled, dry air then enters the passenger compartment of the vehicle.

So as to maximize the amount of surface area available to the incoming air and, correspondingly, to more efficiently cool and dry that air, the design of the evaporator unit is typically a tubeplate-and-air center type heat exchanger containing flat ribbed tubes, similar to the tube-and-fin type designs. The evaporator is assembled by stacking and brazing together matching clad aluminum sheet components. Each of the clad aluminum components is formed from special aluminum brazing stock material which has been stamped so as to construct an internal arrangement of tubular shapes. The matching stamped aluminum tubeplates are then stacked and brazed together in a vacuum furnace, so as to form the tubeplate-and-center type evaporator.

As stated, the evaporator contains a multitude of internal tubes, which all must be brazed during a single brazing operation. There are practically hundreds of these brazements which must be formed concurrently. Generally, this is accomplished by employing a particular aluminum alloy brazing stock material as the matched tubeplates. The aluminum alloy brazing stock material consists, for example, of an appropriate aluminum alloy core which has been clad on both sides with an aluminum-based brazing alloy. Typically, the cladding layers are an aluminum-silicon eutectic brazing alloy characterized by a melting point lower than the core aluminum alloy. Therefore, the clad layers of brazing alloy melt during the vacuum brazing operation and flow toward the desired joint regions and upon cooling solidify to form the brazements. The core aluminum alloy does not melt during the brazing operation and thereby constitutes the structural part of the tubeplate-and-center type evaporator. In the past, the aluminum alloy brazing stock material which has been routinely used to form these types of plate type evaporators consists of a core layer of aluminum alloy AA 3005, as designated by the Aluminum Association (AA), that has been clad on both sides by an aluminum-silicon brazing alloy, specifically aluminum alloy AA 4047.

Generally speaking, this particular aluminum alloy brazing stock material has performed satisfactorily over the years. The material is easily stamped for formation of the tubeplates. In addition, there are no inherent brazing difficulties associated with the use of this particular brazing stock material, and the structural integrity of the material during use is sufficient.

However, the corrosion resistance of evaporator units formed from this specific material is less than desired. In particular, it has been found that if the evaporator is positioned horizontally within the engine compartment rather than vertically, so as to allow the refrigerant to settle within the tubular structures when the unit is not in operation, there is an increased incidence of failures due to corrosion of the evaporator unit. This is especially problematic if the horizontally-oriented tubeplates of the evaporator unit are also exposed to long periods of wetness due to the use of a climate control switch within the passenger compartment of the automobile which automatically regulates the temperature of the incoming air.

The corrosion problem associated with this material appears to be due, not only to the presence of the refrigerant which tends to chemically attack to aluminum, but also the presence of sulfur within the incoming air. A high concentration of sulfur tends to generally occur around the corrosive perforations of the evaporator and the perforations tend to occur in those aluminum tubeplates which face towards the incoming air from outside of the vehicle. It is believed that sulfur is derived from either sulfuric acid droplets and/or sulfur dioxide. Airborne sulfur and/or sulfuric acid droplets could arise from the smokestacks of power utilities burning high sulfur coal or from the catalytic converters of automobiles which may also be the source for the sulfur dioxide gas.

In the past, the corrosion resistance of an air conditioning evaporator formed from this conventional aluminum brazing stock material would typically be enhanced by coating the evaporator with a protective chromate layer. However, due to increased concerns about the environment, the industry is working to eliminate the use of this protective chromate coating because of the toxic by-products produced by the process. The goal is to eliminate the use of the chromate conversion process entirely.

Therefore the industry needs an aluminum alloy brazing stock material which has improved corrosion resistance so that an evaporator unit formed from this material can survive the aggressive automotive environment without the requirement for an additional protective chromate coating. In addition, the core alloy of this brazing stock material must be capable of resisting corrosion due to the compositionally different braze alloy present at the multitude of brazed joints within the evaporator. Lastly, the core alloy of this improved brazing stock material must also be sufficiently ductile so as to respond to the room temperature stamping operations used for formation of the multitudes of internal tubes, while having sufficient strength to contain the high pressure refrigerant over repeated thermal cycling within a typical automotive environment.

SUMMARY OF THE INVENTION

It is therefore an object of this invention to provide a clad aluminum alloy brazing stock material for use in the evaporator unit of an automobile air conditioning system.

It is a further object of this invention that such an aluminum alloy brazing stock material contain a unique and improved aluminum alloy core which has been clad on both sides with an appropriate aluminum-silicon brazing alloy, wherein the improved aluminum alloy brazing stock material is characterized by sufficient ductility so as to permit room temperature stamping of the material for formation of a tubeplate type heat exchanger evaporator.

Lastly, it is still a further object of this invention that an air conditioning evaporator unit formed from such an improved aluminum alloy brazing stock material be characterized by superb corrosion resistance as compared to conventional units having a protective chromate coating, as well as have sufficient strength over the extended thermal cycling which is typical of an automotive environment.

In accordance with a preferred embodiment of this invention, these and other objects and advantages are accomplished as follows.

According to the present invention, there is provided an improved aluminum alloy brazing stock material which is suitable for use in an evaporator within an automobile air conditioning system. The improved aluminum alloy brazing stock contains a unique aluminum alloy core material that has been clad on both sides with an appropriate aluminum brazing alloy.

The inventive aluminum alloy core material is characterized by a higher copper concentration and a lower manganese concentration as compared to the conventional aluminum alloy AA 3005, which is generally used in these types of automotive evaporator units. The aluminum alloy core material of this invention is preferably clad with the conventional aluminum-silicon brazing alloy, AA 4047. The higher concentration of copper within the inventive aluminum alloy core material makes the alloy more noble relative to the electrode potential of the aluminum-silicon brazing alloy which is clad to the core alloy and which forms the multitude of brazements within the evaporator unit during the brazing operation.

A particularly advantageous feature of this invention is that an air conditioning evaporator unit formed from the aluminum alloy brazing stock material of this invention is characterized by enhanced corrosion resistance, as compared to the conventional aluminum alloy brazing stock material which has been treated with a protective chromate coating. In addition, the brazing stock material of this invention is sufficiently ductile to be stamped at room temperature into the intricate tubeplates which are brazed together to form the tubeplate-and-center type evaporator unit. Further, the strength of this brazing stock material is sufficient to contain a high pressure refrigerant even over extended thermal cycling which is characteristic of an automotive environment.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

According to the present invention, there is provided an improved aluminum alloy brazing stock material adaptable for use in a tubeplate-and-center type (or plate type) evaporator unit within an automobile air conditioning system, which is characterized by good formability, superb corrosion resistance and sufficient strength over extended thermal cycling and use.

Figure 1:
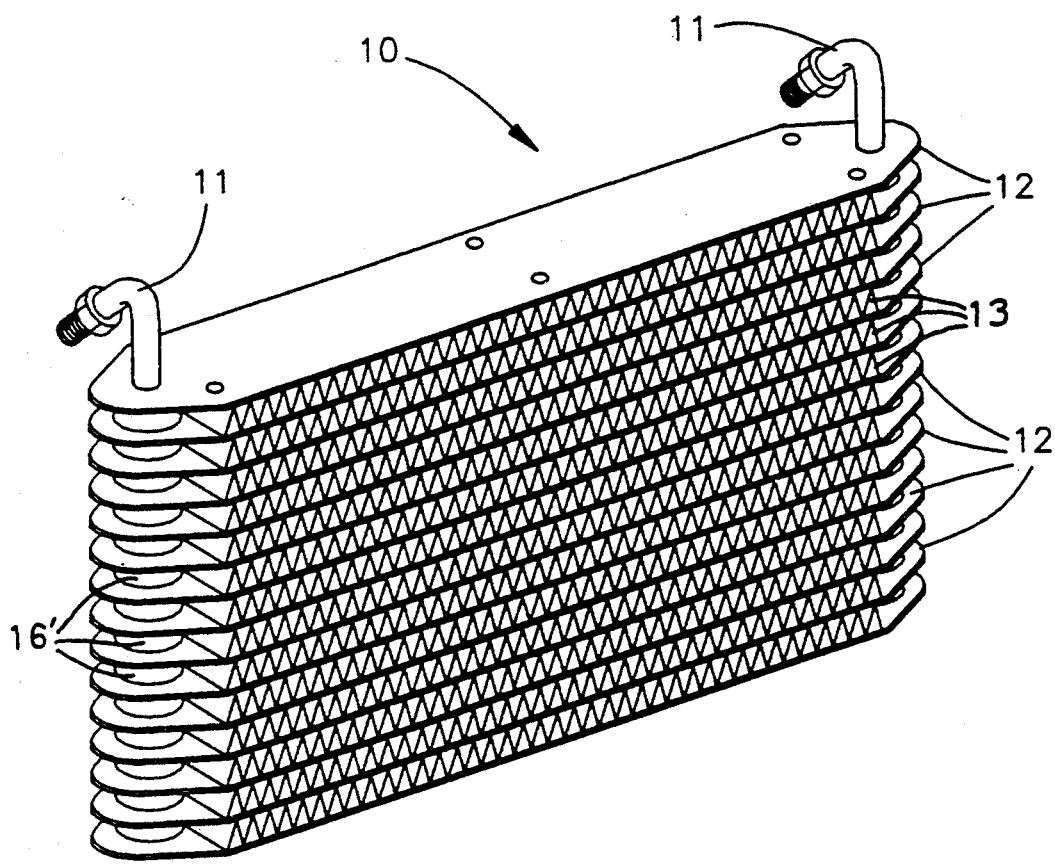
FIG. 1 illustrates a conventional tubeplate-and-center type (or plate type) evaporator used routinely within automobile air conditioning systems.

Shown in FIG. 1 is an exemplary view of a conventional tubeplate-and-air center type evaporator unit 10 used routinely within automobile air conditioning systems. The tubeplate-and-air center design is preferred for these types of heat exchangers, i.e., an air conditioning evaporator 10, because this particular design maximizes the amount of surface area that is in contact with the incoming air, for cooling of that incoming air. The evaporator 10 is made by brazing together a plurality of tubeplates 12 and air centers 13. Each tubeplate 12 provides one or two bottomless, flanged cups 16 that is (are) brazed to an abutting cup on an adjacent plate 16 to form refrigerant manifolds 16'. Appropriate piping 11 is provided for inlet and outlet of the refrigerant during operation.

Figure 2:
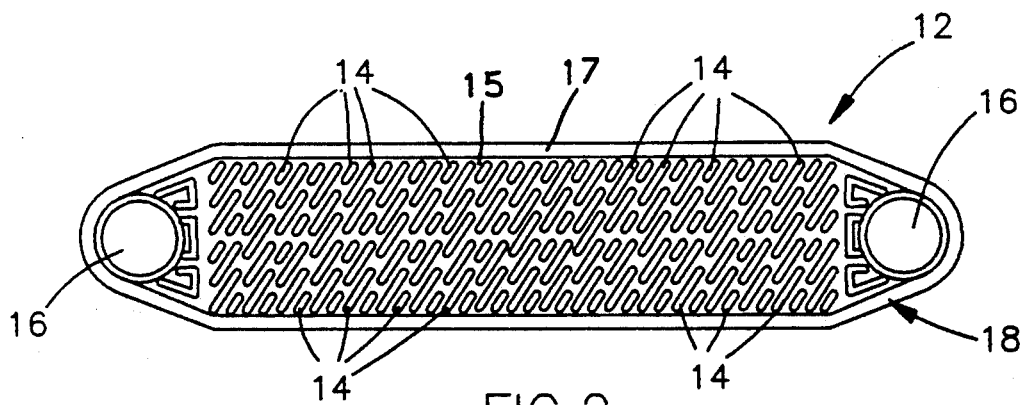
FIG. 2 is a top view of the plate type evaporator unit shown in FIG. 1 and shows the intricate rib pattern stamped into a single tubeplate formed from the inventive aluminum alloy brazing stock material.

FIG. 2 is a top view of an individual tubeplate 12. The tubeplate 12 is formed by appropriately stamping a sheet of aluminum brazing stock material. Each tubeplate 12 is stamped so as to have a shallow, recessed flat tube area 15 with a multitude of baffles 14 projecting from the tube wall 15. Each tube also has a brazing flange 17 as well as two deep drawn cupped regions 16 for reservoir of the refrigerant. Matching tubeplates (12), having corresponding recesses 15 and baffles 14, are then stacked on top of each other and banded together with interposed air centers 13. The banded stack of tubeplates 12 and air centers 13 is then brazed so as to concurrently join all of the tubular structures 14 and air centers within the evaporator unit. As is readily apparent from the view of the tubeplate 12 in FIG. 2, a multitude of brazed joints must be successfully formed at each of the matched tubular configurations 14 during a single brazing operation.

Figure 3:
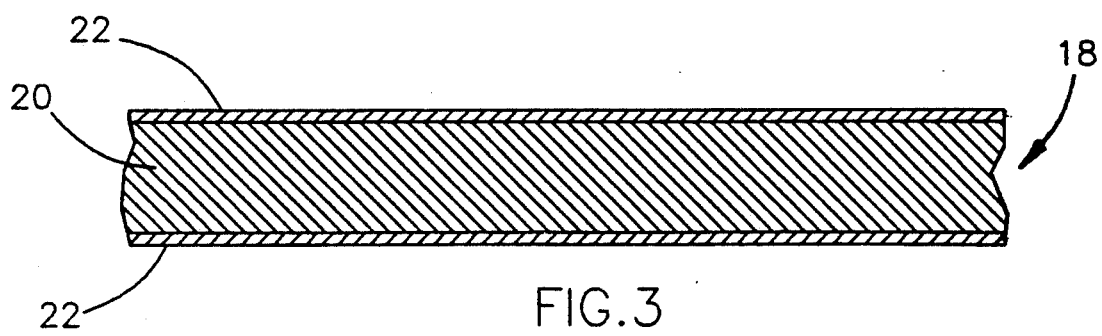
FIG. 3 is an enlarged cross-sectional view of the aluminum alloy brazing stock in accordance with a preferred embodiment of this invention.

The preferred material for formation of these types of tube plate evaporator units 10, which require a multitude of concurrently formed brazed joints, is the clad aluminum alloy brazing stock material 18 of this invention. Shown in FIG. 3, is a cross-sectional view illustrative of this type of clad brazing stock material 18. The sheet of preferred aluminum alloy, which forms the structural core of the material or "core layer" 20, is clad on both surfaces with an appropriate aluminum-based brazing alloy 22 so as to form a sandwich-like structure 18.

The preferred aluminum alloy for use as the core layer 20 within the brazing stock material 18 of this invention is characterized by the following elemental analysis in weight percent and is summarized in Table I below: from about 0.4 to about 0.5 percent copper (Cu); from about 0.5 to about 0.9 percent manganese (Mn); from about 0.2 to about 0.4 percent iron (Fe); up to about 0.2 percent silicon (Si); up to about 0.05 percent titanium (Ti); about 0.2-0.6 percent magnesium (Mg); and normal amounts of aluminum-making impurities including up to about 0.1 percent chromium (Cr), up to about 0.01 percent nickel (Ni) and up to about 0.25 percent zinc (Zn); the balance of the alloy being aluminum (Al). Throughout this description, percents refer to weight percents within the composition of the alloy 20.

TABLE I

| | |
|---|---|
| Cu | 0.4-0.5% |
| Mn | 0.5-0.9% |
| Fe | 0.2-0.4% |
| Si | 0.2% (max) |
| Ti | 0.05% (max) |
| Mg | 0.2-0.6% |
| Cr | 0.1% (max) |
| Ni | 0.01% (max) |
| Zn | 0.25% (max) |
| Al | Balance |

More particularly, although the copper content within the aluminum alloy of this invention preferably ranges from about 0.4 to about 0.5 weight percent, the most preferred copper concentration is about 0.45 weight percent. The presence of copper within the alloy enhances the corrosion resistance of the alloy. This relatively high concentration of copper makes the preferred aluminum alloy, which is the structural core 20 within the brazing stock material 18, more noble relative to the electrode potential of the aluminum-silicon brazing alloy 22 which is clad to the preferred core alloy 20 and which forms the multitude of brazements within the tubeplate-and-center type evaporator 10 during the brazing operation. Optimal results appear to be achieved with a copper concentration of about 0.45 weight percent, as discussed more fully later.

The optimal range of manganese within the preferred alloy varies generally from about 0.5 to about 0.9 weight percent, with a manganese content of about 0.7 weight percent being most preferred. The presence of manganese within the preferred alloy is useful since the manganese combines with the iron in the alloy so as to form the intermetallic compound, $(Mn,Fe)Al_6$. This intermetallic manganese-iron compound is characterized by an electrode potential very close to that of the aluminum matrix. This reduces the tendency for the matrix to corrode. The iron-rich intermetallic compound, $FeAl_3$, which typically forms when manganese is not present and which is more noble than the aluminum matrix, leads to a high degree of intergranular corrosion.

It is believed that if more than about 0.9 weight percent manganese is present, the ductility of the preferred core alloy is adversely affected. Thus, it is extremely difficult to successfully stamp sheets of the alloy into the desired tubeplates 12 having the deep drawn cup portions 16. The cup area 16 is subject to high rates of strain during the forming operation.

In addition, it is also believed that if manganese is present in higher concentrations than about 0.9 weight percent within the alloy, it will impair with the age hardening mechanism associated with the copper content in the alloy that leads to the development of good burst strength and thermal cycle endurance. The preferred alloy is characterized by a constitution which is effectively solution annealed by the vacuum brazing process, particularly during the rapid air quench in the exit chamber of the brazing furnace. Under these conditions, the preferred alloy develops a natural age hardening response which results in the superb thermal cycle endurance. Manganese in excess of the 0.9 weight percent level could cause the fine particles responsible for the age hardening response to combine into coarse manganese rich particles, which would be detrimental to the age hardening process. Therefore, it is preferred that the manganese concentration vary between about 0.5 and 0.9 percent, with about 0.7 percent being most preferred.

The iron concentration within the preferred aluminum alloy preferably ranges between about 0.2 and about 0.4 weight percent, with the most preferred concentration being about 0.3 percent. The corrosion resistance of the alloy is impaired by the presence of iron within the alloy, therefore it is desirable to minimize the amount of iron within the alloy. However, the detrimental effects due to the presence of iron are minimized by the presence of manganese within the alloy. As stated previously, the manganese combines with the iron to form a less deleterious phase than the $FeAl_3$ intermetallic phase, which is the normal combination between the iron and the aluminum. Therefore, although it is desirable to minimize the iron content, from experience it is known that there must be some amount of iron present within the alloy. Without some iron, it would be extremely difficult, if not impossible, to successfully cast this copper containing alloy using the direct chill casting process, which is the preferred method for forming this alloy. This is true regardless of whether alternative means for improving castability of the alloy have been employed, such as by the addition of titanium diboride grain refiners or by the modification of the chill water rate used in the casting operation. For these reasons, the preferred alloy contains about 0.2 and 0.4 weight percent iron. Titanium in the amount of at least 0.02% by weight as titanium diboride ($TiB_2$) is also required in conjuction with the iron.

The titanium concentration should preferably not exceed about 0.05 weight percent within the alloy. A small amount of titanium is desired since it provides a grain refining mechanism within the preferred aluminum alloy. A titanium concentration of up to about 0.05 weight percent appears to amply provide this mechanism and allows the alloy to be cast without ingot cracking. Yet, it is detrimental to the alloy's performance to exceed this amount of titanium, since too high a level of titanium impairs the ductility of the formed alloy which is necessary for fabrication of the intricate tube plates.

The concentration of silicon within the preferred alloy may vary up to about 0.2 percent, with a content of up to about 0.15 percent being most preferred. Free silicon within the aluminum alloy, as well as aluminum silicon intermetallic compounds or alternatively aluminum-iron-silicon intermetallic compounds, are more noble relative to their electrode potentials than the aluminum matrix within the alloy. Therefore, the presence of silicon in any of these forms may cause severe intergranular corrosion. Thus, it is desirable to minimize the amount of silicon within the alloy as practically as possible. It would be desirable to eliminate all of the silicon within the alloy, however silicon is a normal impurity found within the primary aluminum used to form the alloy. It would be prohibitively expensive to require that the primary aluminum used to form the alloy contain less than about 0.20 percent silicon, although a restriction of such would be preferred.

The magnesium content within the preferred alloy ranges between about 0.2 to about 0.6 weight percent magnesium. The presence of magnesium, even though in small amounts, is advantageous since the magnesium acts as a getterer during the brazing process. The magnesium vaporizes upon exposure to the elevated temperatures experienced during brazing and then scavenges residual oxygen from the environment so as to deter the development of a detrimental oxide film on the surface to be brazed.

The content of the remaining constituents of the preferred alloy fall within the range of normal trace elements which occur during the smelting of the primary aluminum from bauxite prior to casting: including up to about 0.1 percent chromium, up to about 0.01 percent nickel, and up to about 0.25 percent zinc.

The balance of the preferred alloy is aluminum

Three alloys were cast having a composition within the preferred range of elemental concentrations, as described above. The composition of the major constituents of the three alloys, A, B and C, are listed in Table II, with the balance of each alloy being essentially aluminum.

TABLE II

| Alloy | Cu | Mn | Fe | Si | Ti | Mg |
|-------|------|------|------|------|-------|------|
| A | 0.43 | 0.72 | 0.34 | 0.16 | 0.028 | 0.48 |
| B | 0.44 | 0.79 | 0.20 | 0.06 | 0.016 | 0.52 |
| C | 0.41 | 0.79 | 0.21 | 0.06 | 0.016 | 0.52 |

The three alloys were formed using the following method. Each alloy was cast using known techniques, then conventionally homogenized at an elevated temperature of about at least about 1000° F. for a duration sufficient to dissolve any segregation within the cast alloy, and rolled to an appropriate thickness. Both sides of the sheet stock of each preferred core alloy 20 were clad with aluminum-silicon brazing alloy AA 4047 (denoted as layers 22). Brazing alloy AA 4047 may be applied to the sheet of preferred core alloy 20 in the form of wire, rod, sheet or powder. It would appear that the sheet form of the brazing alloy is most practical for cladding to the sheets of core alloy. Brazing alloy AA 4047 is characterized by a nominal composition of about 12 weight percent silicon and the balance aluminum. It is a eutectic brazing alloy and therefore melting is initiated at its eutectic temperature during the brazing operation which is less than the melting temperature of the core alloy. It is to be noted that although the preferred core alloys of this invention were clad with brazing alloy AA 4047, any other suitable brazing alloy could be substituted for the AA 4047 that is characterized by an appropriate melting range as described below. Alternative brazing alloys could include other eutectic, hypoeutectic or hypereutectic aluminum-silicon brazing alloys. The AA 4047 was employed because of its proven reliability in the formation of brazed joints within an evaporator unit 10 for use in an automotive air conditioning system.

Once the preferred core alloy 20 is clad with the two layers 22 of brazing alloy, it is referred to as aluminum brazing stock material 18 and is rolled using conventional techniques to an appropriate thickness. For formation of the evaporator units 10, the aluminum brazing stock material 18 is rolled to a thickness of about 0.019". Depending on the particular application for the aluminum brazing stock material 18, the thickness may vary considerably. Each of the two clad layers 22 of brazing alloy constitute about ten percent of the total thickness of the aluminum brazing stock material 18. Therefore, the total amount of brazing alloy within the aluminum brazing stock is about 20 percent. Accordingly, the thickness of the braze alloy 22 applied to the core alloy 20 during cladding (prior to the final rolling steps to the desired thickness) will depend upon the desired final ratio of the two materials. This ratio of braze alloy 22 to core alloy 20 in the total thickness of the aluminum brazing stock material 18 will also vary depending on the particular application and whether both sides of the core alloy 20 are clad, and therefore can be adjusted easily.

After rolling to the desired thickness, the aluminum brazing stock material 18 is annealed in a nitrogen atmosphere to eliminate the residual work hardening effects associated with the rolling process so as to fully soften the material.

The aluminum brazing stock materials 18 containing the preferred aluminum core alloys 20 were sufficiently ductile so as to be successfully stamped at room temperature into the tubeplate 12 configurations shown in FIG. 2 using conventional techniques. Experience has shown that a specific cupped region 16 in the tubeplate 12 must reach or exceed a height of about 0.305" during the stamping operation. During stamping of tubeplates 12 formed from the brazing stock 18 containing the Alloy A of this invention, a cupped region 16 having an average height of approximately 0.312" was repeatedly formed; therefore indicating that the ability of the inventive alloy to be stamped is at least as good as the conventional materials. In addition, there were no extraordinary difficulties encountered during the formation of the tubeplates 12 by stamping. It is believed that Alloys B and C would also perform as satisfactorily as Alloy A with regard to the stamping process.

The stamped tubeplates 12 were then stacked and banded using production techniques known in the industry for formation of these evaporator units 10. In particular, the evaporator 10 is built up from side plates, air centers (which are the zigzagged portions shown in FIG. 1), nested tube plates halves (12), and steel "baking" frames on a stack and band wheel. After steel bands are tightened around the assembly and crimped with band clips, the assembly fits into a rack with many other similar evaporator assemblies.

The evaporator units 10 formed from the brazing stock material 18 containing the core alloys 20 of this invention are then brazed in a three chamber vacuum brazing furnace. The entrance vestibule of this furnace is evacuated with roughing pumps and then a heat up to about 800° F. occurs. Next, the rack travels into the brazing chamber and the doors to this chamber close. The assemblies are then subject to a high vacuum about $10^{-4}$ Torr and the temperature rises to about 1110° F. whereupon the clad braze layers liquefy and fill the joints in the assembly producing a leak free evaporator unit 10. After about one to two minutes at peak temperature, the door to the high vacuum braze chamber opens and the assemblies enter the exit chamber where they are cooled very rapidly to room temperature in a stream of cold air.

The particular thermal cycle used for brazing of the evaporator units 10 will depend on the particular brazing alloy 22 which is clad to the core alloy 20. With the clad brazing alloy AA 4047, the optimal range of brazing temperatures is between about 1080° F. to about 1120° F. so as to ensure complete melting of the eutectic brazing alloy, since the approximate melting point of alloy AA 4047 is about 1070° F. to about 1080° F. The melting temperature of the preferred core alloys 20 of this invention is approximately about 1165° F., which is sufficiently higher than the optimal brazing range. Therefore, at exposure to the brazing temperature, the brazing alloy will be drawn by capillary action towards the seams at the desired braze joints and upon cooling will solidify to form the desired braze bond. The result is a leak-free joint between components. As stated previously, other brazing alloys could be used, so long as they are characterized by a melting temperature of less than about 1165° F., which is approximately the melting temperature of the core alloy 20. The core alloy 20 of this invention provides the structural component of the material.

Brazing preferably occurs in a vacuum furnace so as to reduce or eliminate the formation of a detrimental oxide layer and the corresponding need for the corrosive flux typically employed in air furnace brazing operations. In addition, the vacuum brazing facilitates the concurrent brazing of the multitude of brazed joints within the evaporator unit 10, which may not be so with other forms of brazing, such as dip brazing or wire brazing techniques. However, although vacuum furnace brazing is highly preferred as the method for forming these evaporator units 10 because of these practical concerns, other alternative methods for brazing may be utilized.

The evaporators formed from the aluminum brazing stock 18 of this invention were brazed successfully and did not show evidence of irregularities or discontinuities around the braze fillets. The incidence of leaking evaporators after brazing using the material of this invention was comparable to conventional experience using evaporators formed from the conventional AA 3005 core material which had been clad with the AA 4047 brazing alloy.

After brazing, assembly of the evaporator units 10 was completed by welding the appropriate components to the inlet and outlet holes (11) of the evaporator. Again, the performance of the units 10 formed from the alloys of this invention were comparable to conventionally formed evaporator units 10.

The units 10 were then tested for corrosion resistance by subjecting evaporators 10 formed from the Alloys A, B, and C of this invention to a salt spray test administered according to the American Society for Testing Materials (ASTM) G85 Annex A 4.4.4.1. The standardized test requires a continuous spray of five percent (5%) salt (NaCl) accompanied by an injection of sulfur dioxide ($SO_2$) gas at the rate of one cubic centimeter per minute per cubic foot of internal space in the testing cabinet for one hour every six hours. The cabinet was maintained at 95° F.

The results are as follows. All of the evaporator units 10 formed from the alloys of this invention withstood the salt spray test and exhibited better corrosion resistance than the evaporator units 10 which had been formed from the conventional brazing stock having a AA 3005 core layer and clad with AA 4047 brazing alloy, even after the conventional units 10 had been treated with a protective chromate conversion coating which enhances corrosion resistance. Of the alloys of this invention, Alloy B appeared to exhibit the best results, yet all of the alloys, A, B and C, lasted almost three times the duration in the salt spray without leakage than the chromate treated conventional units.

Therefore, the alloys of this invention are characterized by significantly enhanced corrosion resistance, which is believed to be due to their increased levels of copper. A metallographic examination of the evaporator units 10 formed from the alloys of this invention after exposure to the salt spray test, revealed that the corrosive attack of the alloy tended to proceed laterally, almost parallel, to the surface of the alloy, which is extremely beneficial since this is less likely to cause perforations in the thickness of the material and corresponding leakage. This lateral direction of corrosive attack on the alloys of this invention is contrary to the direction of corrosive attack within the conventional material, even when treated with the protective chromate coating. In the conventional material, the corrosive attack proceeded along an intergranular path into the core layer, which may more easily lead to perforations and leakage within the material.

It is believed that the lateral movement of the corrosive attack within the alloys of this invention is due to the relatively higher copper content within the alloys which makes the particular alloy more noble relative to the electrode potential of the clad layers of aluminum-silicon brazing alloy 22, thereby causing the corrosion to be advantageously localized in a silicon diffusion layer adjacent to the interface between the clad and core layers, 22 and 20 respectively.

The burst strength of the evaporator units 10 formed from the brazing stock 18 containing the core alloys 20 of this invention was also determined, by filling the evaporator unit 10 with an appropriate fluid and then increasing the pressure of the fluid until leakage was observed. Evaporator units 10 containing core layers 20 of the Alloy A of this invention had an average burst strength of about 487 pounds per square inch. Conventional evaporators containing the AA 3005 material had an average burst strength of about 461 pounds per square inch. Therefore, the burst strength of Alloy A of this invention was about five percent higher than that of the conventional materials. It is believed that Alloys B and C of this invention, which were not burst tested, would perform comparably to Alloy A.

The ability of the evaporator unit 10 to endure the temperature cycling experienced during normal use of an automobile was also tested. The thermal cycling is designed to replicate the temperatures experienced by the evaporator 10 when the automobile is started cold and then heated by normal engine operation before the air conditioning system is turned on which cools the evaporator 10. The evaporators 10 were appropriately charged with a combination of compressor oil and refrigerant, such as standard R12 or Freon, and the pressure was cycled from about zero to about 250 pounds per square inch. The evaporator units 10 formed from a core layer 20 of Alloy A of this invention exhibited significantly greater thermal cycling endurance as compared to the conventional evaporator units formed from a core layer of AA 3005.

In summary, ten percent of the Alloy A evaporator units 10 failed after 11,993 thermal cycles as described above, while ten percent of the conventional evaporators failed after only 7378 cycles. Fifty percent of the Alloy A evaporator units 10 failed after 26,567 thermal cycles, while fifty percent of the conventional evaporators failed after 12,883 cycles. Two-thirds of the Alloy A evaporator units 10 failed after 31,014 thermal cycles, while two-thirds of the conventional evaporators failed after 14,360 cycles. It is clear that the evaporator units 10 formed from a core layer of Alloy A of this invention exhibited a significant improvement in average lifetime as compared to the conventional evaporator units 10, in particular, about twice the average lifetime of the conventional evaporator units. Again, it is believed that the Alloys B and C of this invention would perform comparably to Alloy A.

This improved burst strength and thermal cycle strength of the alloys of this invention is particularly advantageous since current environmental demands require a change in the present refrigerant, R12 or Freon, for automotive air conditioning systems. The probable substitute refrigerant, R134A which is a 1,1,1,2-Tetrafluoroethane, will require stronger evaporator units 10 because of its higher vapor pressure.

In addition, for Alloy A of this invention, the average tensile strength was determined to be about 19,900 pounds per square inch and the average yield strength about 9,100 pounds per square with about an average of 23 percent elongation. These values are comparable (actually slighter better) to the corresponding values for the conventional AA 3005 aluminum alloy. Again, it is believed that the Alloys B and C of this invention would perform equally as well as Alloy A.

There are many advantages associated with the aluminum alloy brazing stock 18 of this invention which contains the improved aluminum alloy core material 20 clad between layers 22 of an appropriate aluminum brazing alloy, in particular aluminum-silicon brazing alloy AA 4047. The inventive aluminum alloy core material 20 is characterized by a relatively higher copper concentration and lower manganese concentration as compared to conventional aluminum alloys which are employed for use in a tubeplate-and-center type automotive air conditioning evaporator unit 10. The elemental constitution of the aluminum alloy of this invention sufficiently cooperates to provide a brazing stock material 18 which is readily formable and brazeable, yet which also exhibits improved strength and enhanced corrosion resistance, not only towards the elements in the environment but also with respect to the clad brazements, over the life of an air conditioning evaporator unit 10 formed from the inventive material.

Therefore, while our invention has been described in terms of a preferred embodiment, it is apparent that other forms could be adopted by one skilled in the art, such as by modifying the aluminum alloy within the preferred ranges of element concentrations; or by cladding the core alloy with a substitute braze alloy; or by modifying the processing steps or evaporator design employed. Accordingly, the scope of our invention is to be limited only by the following claims.

The embodiments of the invention in which an exclusive property or privilege is claimed are defined as follows:

1. An automotive air conditioner evaporator comprising tubeplate portions, where the tubeplate portions are formed from stamped sections of an aluminum alloy brazing stock material, said aluminum alloy brazing stock material comprising:

an aluminum alloy core layer consisting essentially of the following by weight, from about 0.4 to about 0.5 percent copper, from about 0.5 to about 0.9 percent manganese, from about 0.2 to about 0.4 percent iron, up to about 0.2 percent silicon, up to about 0.05 percent titanium, from about 0.2 to about 0.6 weight percent magnesium, and the balance being substantially all aluminum with permissible trace amounts of ordinarily present elements;

said aluminum alloy core layer being clad on both surfaces with an appropriate thickness of an aluminum-silicon brazing alloy, such that the aluminum alloy brazing stock material containing said aluminum alloy core layer is sufficiently ductile to be readily stamped at room temperature and brazeable in vacuum so as to form the air conditioner evaporator, and said elements within said aluminum alloy core layer sufficiently cooperate together so as to provide enhanced corrosion resistance of said aluminum alloy core layer relative to the environment and relative to said aluminum-silicon brazing alloy.

2. An automotive air conditioner evaporator formed from an aluminum alloy brazing stock material as recited in claim 1, wherein said aluminum alloy core layer is characterized by a tensile strength of about twenty thousand pounds per square inch and a yield strength of about nine thousand pounds per square inch.

3. An automotive air conditioner evaporator formed from an aluminum alloy brazing stock material as recited in claim 1, wherein said thickness of each of said clad layers of aluminum-silicon brazing alloy are about ten percent of the total thickness of the aluminum alloy brazing stock material.

4. An automotive air conditioner evaporator formed from an aluminum alloy brazing stock material as recited in claim 1, wherein said aluminum-silicon brazing alloy is characterized by a melting range of about 1070° F. to about 1100° F.

5. In an automotive air conditioner evaporator comprising means defining one or more flow paths for heat exchange fluid formed from an aluminum alloy brazing stock material that consists of an aluminum alloy core layer clad between layers of an aluminum-silicon brazing alloy, said aluminum alloy core layer consisting essentially of the following by weight:

from about 0.4 to about 0.5 percent copper;
from about 0.5 to about 0.9 percent manganese;
from about 0.2 to about 0.4 percent iron;
up to about 0.2 percent silicon;
up to about 0.05 percent titanium;
from about 0.2 to about 0.6 weight percent magnesium; and
the balance being substantially all aluminum with trace amounts of ordinarily present elements;

such that the aluminum alloy brazing stock material containing said aluminum alloy core layer is sufficiently ductile to be readily stamped at room temperature so as to form the air conditioner evaporator, and said elements within said aluminum alloy core layer sufficiently cooperate to provide enhanced corrosion resistance of said aluminum alloy core layer relative to the environment and relative to said aluminum-silicon brazing alloy.

6. In an automotive air conditioner evaporator formed from an aluminum alloy brazing stock material, as recited in claim 6, said aluminum alloy core layer being characterized by a tensile strength of about twenty thousand pounds per square inch and a yield strength of about nine thousand pounds per square inch.

7. In the method for forming an automotive air conditioner evaporator comprising complementary tubeplate members where said tubeplate members are respectively stamped at ambient temperatures from an aluminum alloy brazing sheet stock material and corresponding members brazed together in vacuum, said aluminum alloy brazing stock material comprising an aluminum alloy core layer which is clad on at least one surface with an aluminum-silicon brazing alloy;

the improvement wherein said aluminum alloy core layer consists essentially of the following by weight, about 0.4 to about 0.5 percent copper, about 0.5 to about 0.9 percent manganese, about 0.2 to about 0.4 percent iron, up to about 0.2 percent silicon, up to about 0.05 percent titanium, about 0.2 to about 0.6 weight percent magnesium, and the balance being substantially all aluminum with trace amounts of ordinarily present elements;

such that the aluminum alloy brazing stock material containing said aluminum alloy core layer is sufficiently ductile to be readily stamped at room temperature and brazeable in vacuum so as to form the air conditioner evaporator, and said elements within said aluminum alloy core layer sufficiently cooperate together so as to provide enhanced corrosion resistance of said aluminum alloy core layer relative to the environment and relative to said aluminum-silicon brazing alloy.

8. A method for forming an automotive air conditioner evaporator as recited in claim 7, wherein said aluminum alloy core layer is characterized by a tensile strength of about twenty thousand pounds per square inch and a yield strength of about nine thousand pounds per square inch.

9. A method for forming an automotive air conditioner evaporator as recited in claim 7, wherein said thickness of each of said at least one clad layers of aluminum-silicon brazing alloy are about ten percent of the total thickness of the aluminum alloy brazing stock material.

10. A method for forming an automotive air conditioner evaporator as recited in claim 7, wherein said aluminum-silicon brazing alloy is characterized by a melting range of about 1070° F. to about 1100° F.

* * * * *